(12) United States Patent
Futakami et al.

(10) Patent No.: US 6,734,948 B2
(45) Date of Patent: May 11, 2004

(54) OPTICAL PRINTER

(75) Inventors: Shigeru Futakami, Tokorozawa (JP); Chikara Aizawa, Tsukui-gun (JP); Toshiyuki Inage, Kawagoe (JP); Kenji Mito, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 84 days.

(21) Appl. No.: 10/054,883

(22) Filed: Jan. 25, 2002

(65) Prior Publication Data
US 2002/0097383 A1 Jul. 25, 2002

(30) Foreign Application Priority Data

Jan. 25, 2001 (JP) ........................ 2001-017592
Jan. 25, 2001 (JP) ........................ 2001-017596

(51) Int. Cl.[7] ................. G03B 27/32; G03B 27/80; G03B 17/50; B41J 2/45; H04N 1/25
(52) U.S. Cl. .................. 355/32; 355/27; 355/38; 396/33; 347/238; 358/302
(58) Field of Search ............... 396/33; 355/27, 355/32, 35, 37, 38, 41, 67, 68, 69, 70, 71; 347/228, 229, 232, 238, 239, 262; 358/302, 501, 527

(56) References Cited

U.S. PATENT DOCUMENTS

| 5,032,911 | A | * | 7/1991 | Takimoto | 358/501 |
| 5,719,661 | A | * | 2/1998 | Terashita | 355/38 |
| 5,796,466 | A | * | 8/1998 | Choi | 355/35 |
| 5,815,244 | A | * | 9/1998 | Tokuda | 355/41 |
| 6,233,036 | B1 | * | 5/2001 | Masubuchi et al. | 355/38 |
| 6,262,757 | B1 | * | 7/2001 | Masubuchi et al. | 347/225 |
| 6,330,397 | B1 | * | 12/2001 | Johnson et al. | 396/32 |

FOREIGN PATENT DOCUMENTS

JP     4-337708     11/1992

* cited by examiner

Primary Examiner—Alan Mathews
(74) Attorney, Agent, or Firm—Finnegan, Henderson, Farabow, Garrett & Dunner, L.L.P.

(57) ABSTRACT

An optical printer capable of controlling the amount of exposure light, and so forth, accurately is disclosed, and the optical printer comprises a light source irradiating light and an optical shutter producing exposure light for exposing a photosensitive object by controlling transmission of the light from the light source.

18 Claims, 11 Drawing Sheets

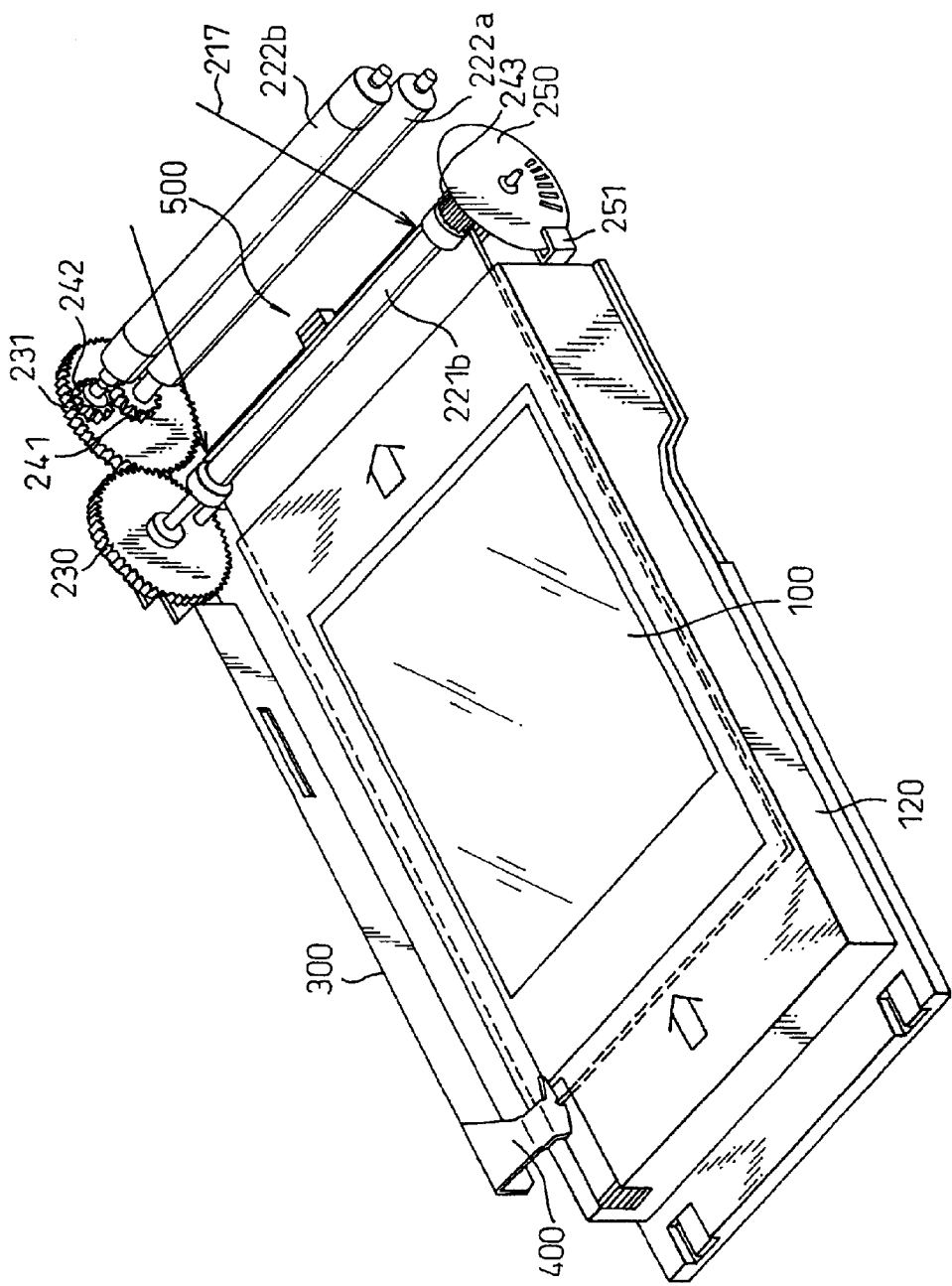

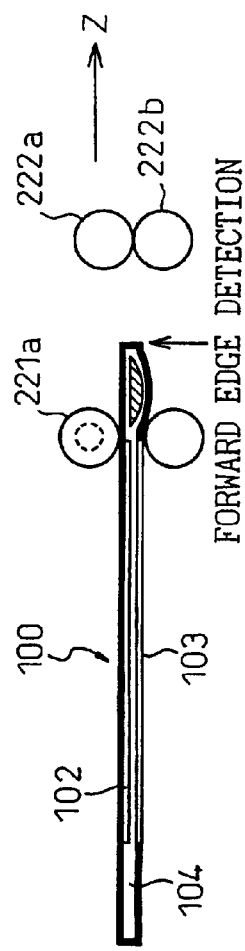
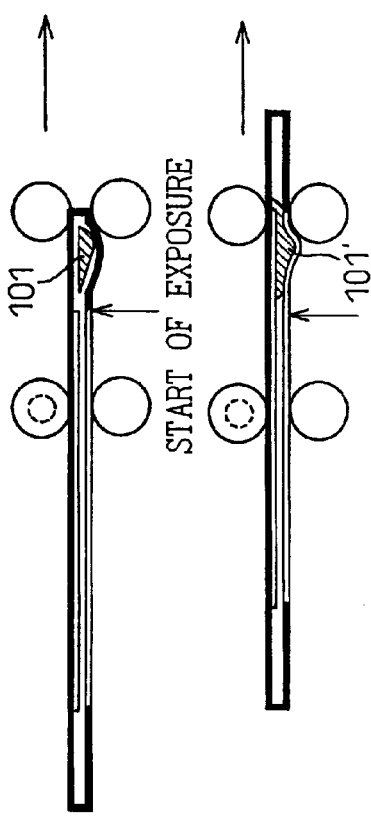
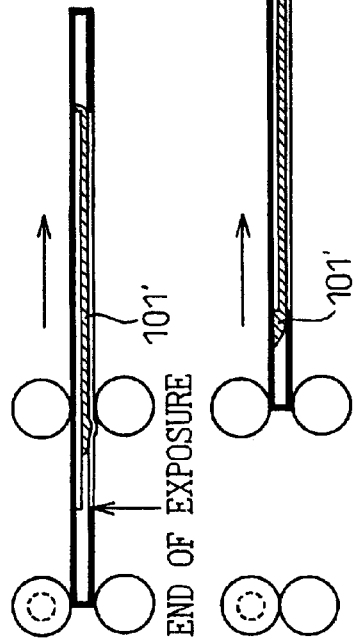
Fig.11A
Fig.11B
Fig.11C
Fig.11D
Fig.11E

OPTICAL PRINTER

BACKGROUND OF THE INVENTION

In a conventional optical printer for producing an image on a photosensitive object by using the light which has passed through an optical shutter from a light source, the amount of the light of the light source is corrected by using the direct light from the light source. However, the amount of the light from the light source varies after passing through the optical shutter. The amount of the light which has passed through the optical shutter does not always vary linearly according to the variation of the amount of the light of the light source. For this reason, the amount of the light which is irradiated directly to a photosensitive object and contributes to the produced image cannot actually be controlled well by controlling the amount of the light of the light source.

On the other hand, when an image is produced on a photosensitive object, the exposure starting position must be decided accurately. Hence, in the conventional optical printer, a sensor for detecting the position of the photosensitive object is provided near the position to start the conveying of the photosensitive object, and the start of the conveying of the photosensitive object is detected based on the output signal from the sensor, and then the time that will elapse before the photosensitive object will reach the exposure starting position, and so on, are presumed to decide the timing of the starting of the exposure. However, the conventional optical printer has a defect that the photosensitive object is not conveyed accurately, the time when the photosensitive object reaches the exposure starting position varies, and thereby the exposure starting position on the photosensitive object is different. As a special sensor must be provided to detect the start of the conveying of the photosensitive object, the cost increases accordingly.

Furthermore, the surface of the instant film in which self-developer is stored is uneven because of the storing portion in which the self-developer is stored. In an optical printer for exposing and developing such an instant film, when the self-developer is squeezed out of the storing portion by the developing device, if the conveying speed at which the instant film is conveyed is increased, the conveying speed fluctuates due to the unevenness of the surface of the instant film. For this reason, the instant film is conveyed with a constant low speed. As a result, there is a problem that much time is required from the exposure and development to the output of the instant film.

SUMMARY OF THE INVENTION

In accordance with an aspect of the present invention, an optical printer forming images by exposing a photosensitive object comprises: a light source irradiating a light; an optical shutter producing exposure light for exposing the photosensitive object by controlling a transmission of the light from the light source; and a photo detector outputting a signal by detecting the exposure light which exposes the photosensitive object.

BRIEF DESCRIPTION OF THE DRAWINGS

The features and advantages of the present invention will be more clearly understood from the following description taken in conjunction with the accompanying drawings in which

FIG. 10 depicts the relationship between an instant film and a detector; and

FIGS. 11A to 11E depict a photosensitive object conveying method.

DESCRIPTION OF THE PREFERRED EMBODIMENTS

At first, described below are an instant film 100 which is a photosensitive object used for an optical printer according to the present invention, and a film cartridge 120 which accommodates a plurality of the instant films 100.

Figure 1:
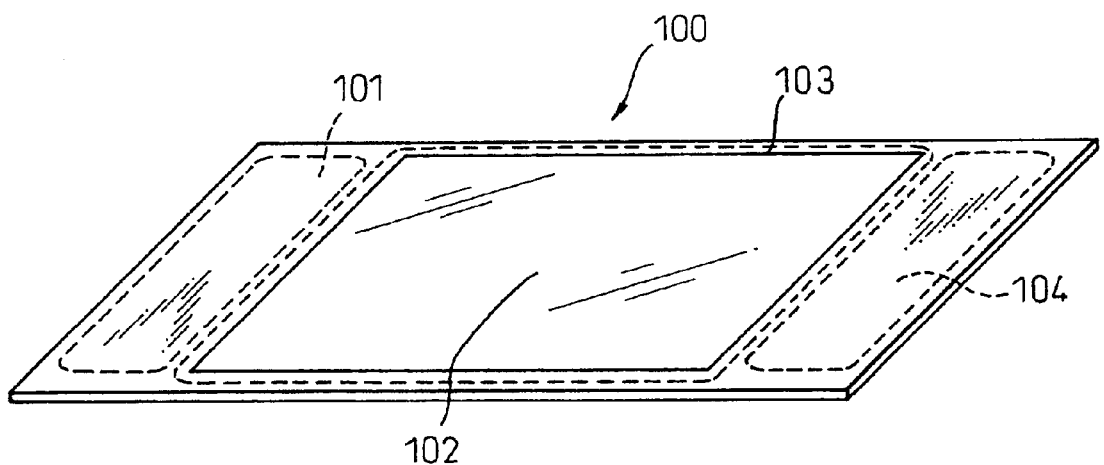
FIG. 1 shows an outline of an instant film.

FIG. 1 shows an outline of the instant film 100. The instant film 100 has a developer pack 101 in which self-developer is stored and which is disposed at one end thereof, a photosensitive material 102, a surface cover 103, and a developer pool 104. The surface cover 103 has a transparent portion facing the photosensitive material 102, and the portions having the developer pack 101, the developer pool 104, etc. are made of opaque material. The instant film 100 is not provided with a photosensitive face on the end portion thereof because of the developer pack 101.

The instant film 100 is developed to produce a full color image in a dark place in such a manner that the photosensitive material 102 is exposed through the transparent portion of the surface cover 103, and that the self-developer is squeezed out of the developer pack 101 to the whole of the photosensitive material 102.

Figure 2:
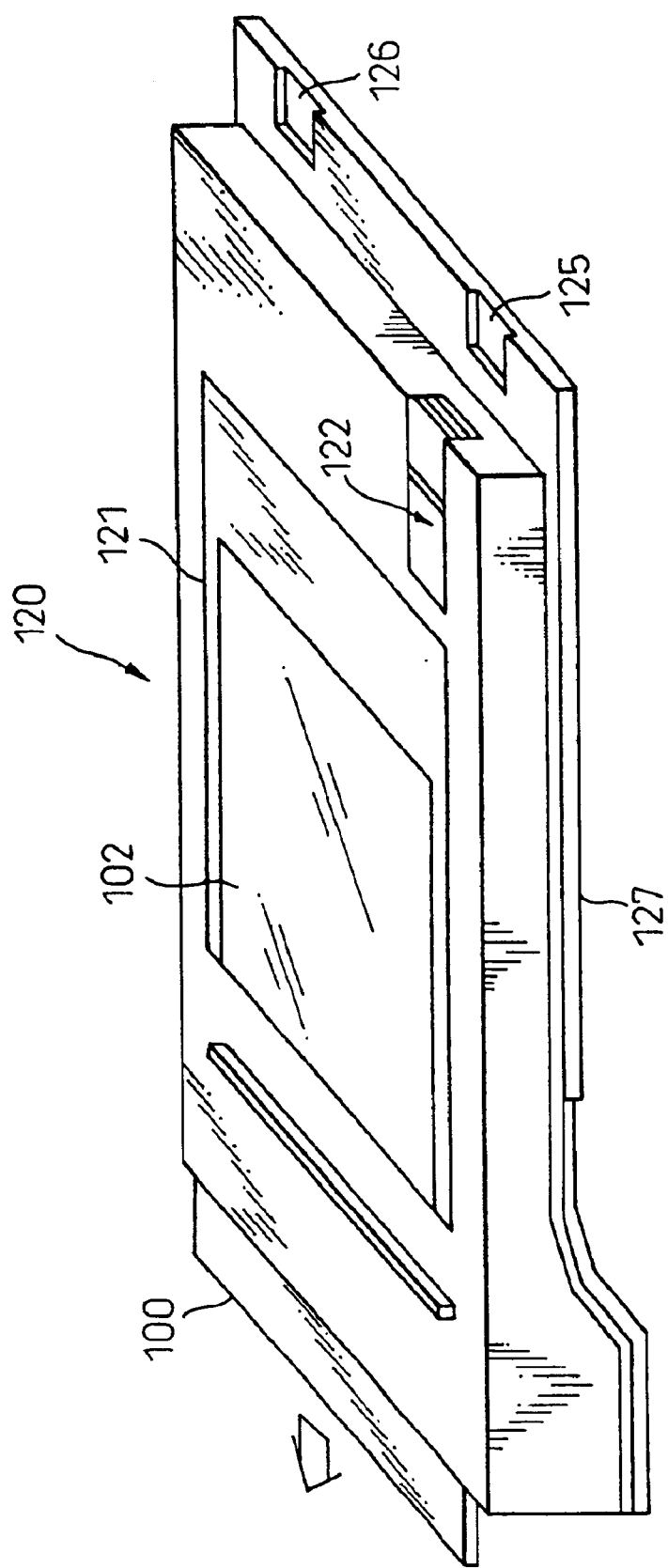
FIG. 2 shows an outline of a film cartridge.

FIG. 2 shows an outline of the film cartridge 120. The film cartridge 120 has a large opening 121 and a small opening 122 from which the rear end of the instant film 100 accommodated in the film cartridge 120 is accessible. The film cartridge 120 is also provided with a battery 127 at the lower portion thereof. The battery 127 supplies the electric power to this cartridge through electrodes 125 and 126. The instant film 100 is taken out of the film cartridge 120 by using the small opening 122, and then is conveyed by the conveyer 220 described later for the purpose of the development, etc.

Figure 3:
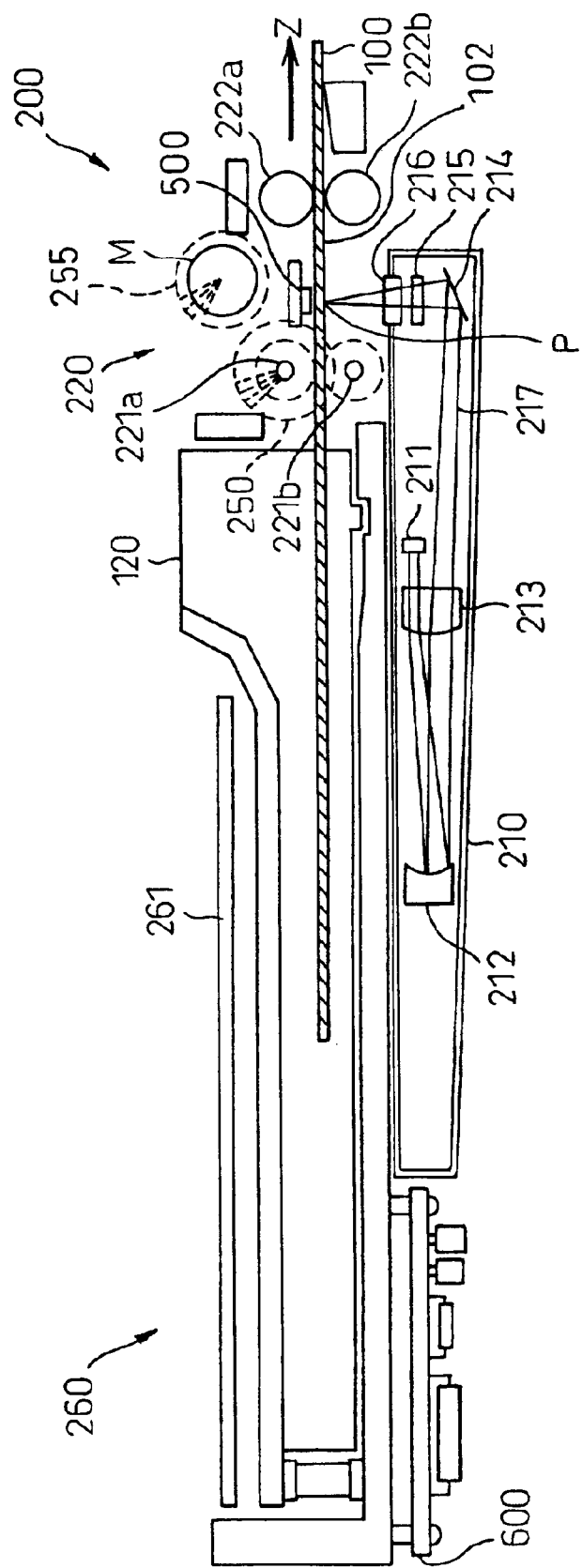
FIG. 3 is a schematic cross-sectional view of an optical printer according to the present invention.

With reference to FIG. 3, the optical printer 200 according to the present invention will be described. FIG. 3 is a schematic central cross-sectional view of the optical printer 200. The optical printer 200 comprises an optical head 210, a conveyer 220, an accommodating portion 260, a control circuit 600, etc.

The optical head 210 is equipped with: a LED unit 211 of a light source having three color (nearly red, nearly green, and nearly blue) LEDs arranged closely; a toroidal lens 213 having a plane lens face and a cylindrical lens face; a parabolic mirror 212 which reflects the light beam 217 irradiated in fan-shape from the light source to generate substantially collimated light beam; a reflecting mirror 214 which reflects 90 degrees upward the light beam 217 which has passed through the toroid lens 213 again to focus the light beam 217 on the exposure point P on the photosensitive face 102; a liquid crystal optical shutter array 215 for transmitting or intercepting the light beam 217 from the light source 211 selectively; and a mask 216. The optical shutter array 215 is configured so as to produce a color latent image of 640 pixels×640 lines on the photosensitive face 102 of the instant film 100. In this embodiment, each of the vertical length and the horizontal length of one pixel is 162 μm.

The liquid crystal shutter array 215 has a line of 640 liquid crystal shutter elements each of which is able to open and close independently and which are arranged in the direction perpendicular to the conveying direction (the direction of the arrow Z in FIG. 3) of the instant film 100. Each of the liquid crystal shutter elements includes the so-called normally white type liquid crystal which transmits the light on the condition (0 V) that the voltage is not applied thereto and which intercepts the light on condition that a predetermined voltage is applied thereto.

The LEDs of the LED unit 211 radiate R, G, and B lights respectively in a time-division manner. The exposure light beams radiated by the LEDs pass through the liquid crystal elements of the liquid crystal shutter array 215 and produce images in a line at a predetermined interval at different positions on the photosensitive face 102. The method of producing a latent image will be described later.

The conveyer 220 is provided next to the accommodating portion 260 in which the film cartridge 120 is accommodated, and conveys and outputs the instant film 100 of a photosensitive object in the direction of the arrow Z with a pair of conveying rollers 221a and 221b and a pair of development rollers 222a and 222b. While the instant film 100 is being conveyed, its photosensitive face 102 is exposed at the exposure point P by the optical head 210, and a latent image is produced.

A detector 500 is provided above the exposure point P so that the amounts of the lights radiated from the LEDs of the LED unit 211 may be controlled and the front end of the instant from 100 may be detected. The detector 500 has an R photo detector 501, a G photo detector 502, and a B photo detector 503.

The aforementioned developer pack 101 is disposed at the front end of the instant film 100 in the conveying direction of the instant film 100 so that the self-developer is squeezed out of the developer pack 101 by the development rollers 222a and 222b to be gradually distributed on the photosensitive face 102 of the instant film 100 which has been exposed. In the development of the latent image on the instant film 100 which has been output from the optical printer 200 is completed after a predetermined time has passed, and the color image is produced.

Since the development starts when the self-developer acts on the photosensitive face 102, it is important that the self-developer does not come in contact with the photosensitive face 102 which has not been exposed. For this purpose, as described later, the conveying rollers 221a and 221b are so made that the diameter of the middle portion is shorter than the diameter of the both end portions, so that the self-developer is not squeezed out of the developer pack 101 by the conveying rollers 221a and 221b.

Furthermore, a rotary encoder 250 is fitted to the shaft of the conveying roller 221a, and the timing of the exposure by the optical head 210 is decided by using the encoder pulses generated by the rotary encoder 250.

The conveying rollers 221a and 221b and the development rollers 222a and 222b are driven by a motor M. To the driving shaft of the motor M, an M rotary encoder 255 is fitted, and the rotation of the motor M is controlled by using the M encoder pulses generated by the M rotary encoder 255.

In the accommodating portion 260, the film cartridge 120, supported by a holder 261, is accommodated.

Figure 4:
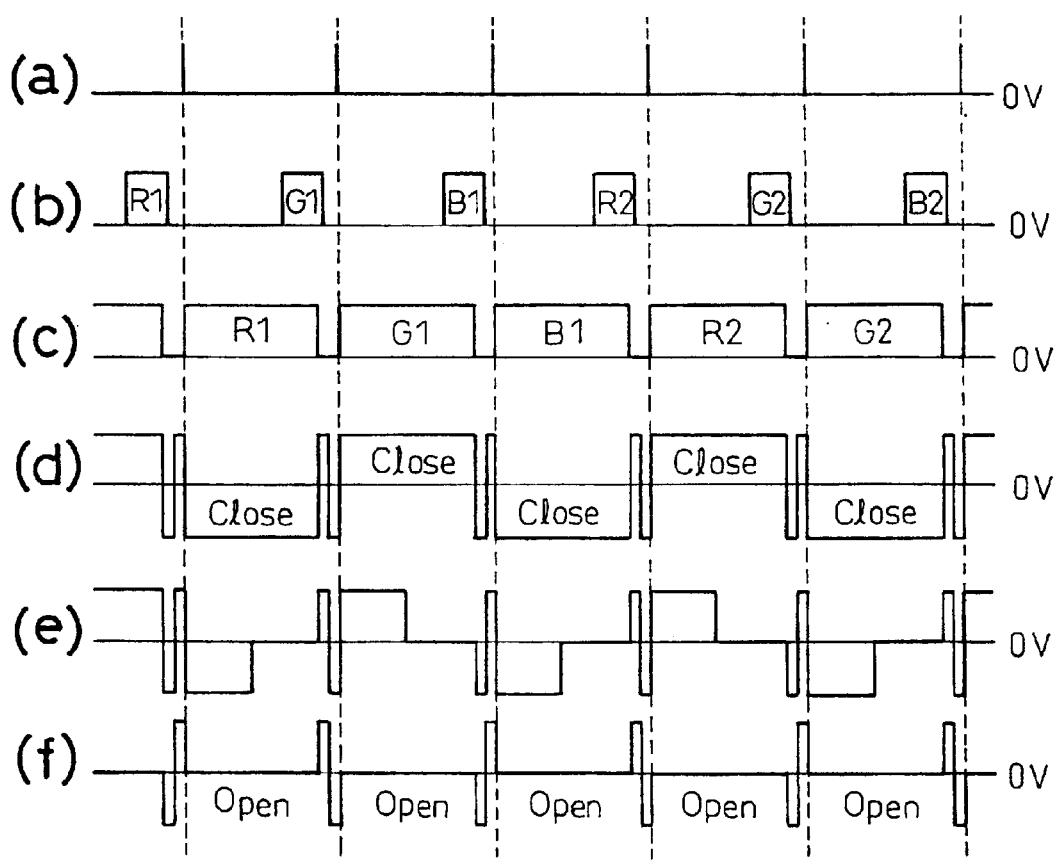
FIG. 4 is a time chart depicting the operation of an optical shutter array.

FIG. 4 shows the encoder pulses (a) generated by the rotary encoder 250, the timing (b) of data transfer, the LED emission pulses (c) supplied to the LED unit 211, and the LCS pulses (d) to (f) supplied to the liquid crystal shutter array 215 for the open/close control of the liquid crystal shutter elements.

As shown by (b) in FIG. 4, the image data for driving the liquid crystal shutter elements is transferred, to the liquid crystal shutter array 215, corresponding to the encoder pulse just before the image data. As shown by (c) in FIG. 4, the LED emission pulses are generated in synchronization with the encoder pulses (a) so that the LEDs of the LED unit 211 radiate at a predetermined time interval repeating the order of R, G, B. Further, the LSC pulses caused by the image data transferred beforehand are generated in synchronization with the encoder pulses (a) to control the open/close operations of the liquid crystal shutter elements.

Since the rotary encoder 255 is fitted to the shaft to which the conveying roller 211a is fitted, the encoder pulses are synchronized with the conveying of the instant film 100. Thus, it may be prevented, by generating the LED radiation pulses and the LCS pulses in synchronization with the encoder pulses, that the quality of the image is reduced due to the irregularity of the conveying.

The LCS pulse (d) in FIG. 4 is the signal by which a predetermined voltage is applied to the liquid crystal shutter elements to close them for the whole duration of the emission of any one of the LEDs. In this case, a black image is produced on the photosensitive face 102 of the instant film 100 after the development of the instant film 100. The LCS pulse (e) in FIG. 4 is the signal by which a predetermined voltage is applied to the liquid crystal shutter elements to close them for the half duration of the emission of any one of the LEDs. In this case, a gray image is produced on the photosensitive face 102 of the instant film 100 after the development of the instant film 100. The LCS pulse (f) in FIG. 4 is the signal by which no voltage is applied the liquid crystal shutter elements to open them for the whole duration of the emission of any one of the LEDs. In this case, a white image is produced on the photosensitive face 102 of the instant film 100 after the development of the instant film 100. As described above, in this embodiment, it is possible to produce 64 levels of each color by controlling the duration of applying the voltage to the liquid crystal shutter elements of the liquid crystal optical shutter array 215.

Further, a pair of positive and negative pulses are applied to all of the liquid crystal shutter elements of the liquid crystal optical shutter array 215 at the end of the exposure of each color in order to be unaffected by the history of the image of each of the liquid crystal shutter elements just before controlling it. In addition, the polarity of the voltage applied to the liquid crystal optical shutter array 215 is inverted every time in order to prevent the deterioration of the liquid crystal. The open/close operation of the liquid crystal shutter elements is irrelevant to the polarity of the voltage applied to the liquid crystal optical shutter array 215, FIG. 5A to FIG. 5F depict the process to produce the latent image on the instant film 100. In this process, the instant film 100 is conveyed at a predetermined conveying speed in the direction of the arrow Z with the conveyer 220. The instant film 100 has a layer R which acts with the light R to produce a latent image, a layer G which acts with the light G to produce a latent image, and a layer B which acts with the light B to produce a latent image. Each of the lights R, G, and B radiated from the optical head 210 produces an image of wide W at a predetermined interval at the exposure point P on the photosensitive face 102 of the instant film 100.

Figure 5A:
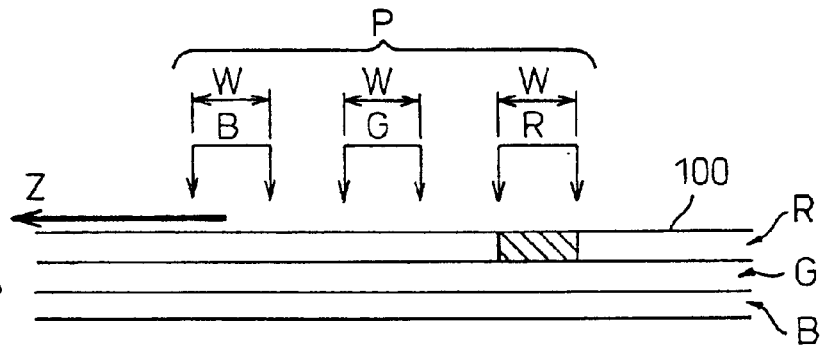
FIG. 5A to FIG. 5F show an outline of an image producing process.

FIG. 5A shows the state at the time when the exposure by the light R is started.

Figure 5B:
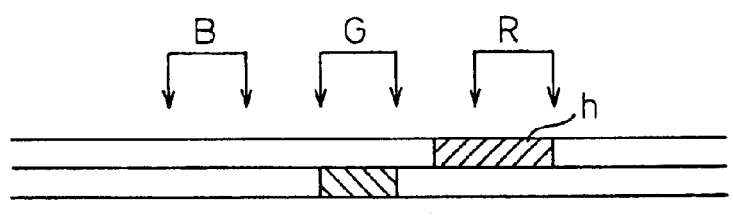

FIG. 5B shows the state at the time when the exposure by the light G is started. In this state, the exposure of the zone h in the layer R by the light R has been completed by the irradiation of the light R for a predetermined duration and the movement of the instant film 100.

Figure 5C:
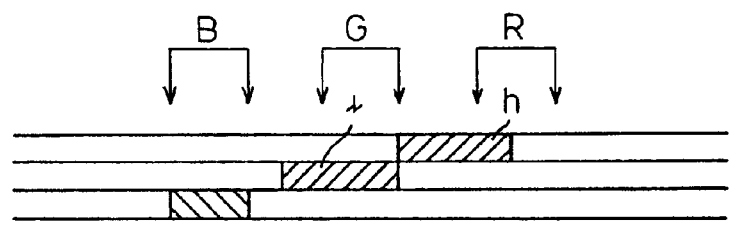

FIG. 5C shows the state at the time when the exposure by the light B is started. In this state, the exposure of the zone i in the layer G by the light G has been completed by the irradiation of the light G for a predetermined duration and the movement of the instant film 100.

Figure 5D:
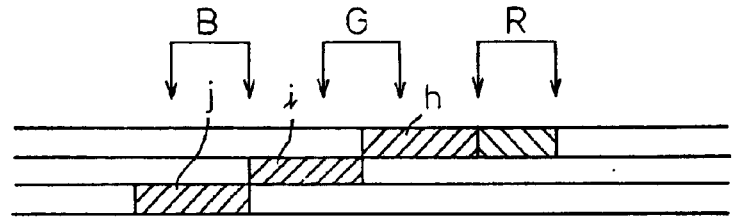

FIG. 5D shows the state at the time when the exposure by the light R is started again. In this state, the exposure of the zone j in the layer B by the light B has been completed by the irradiation of the light B for a predetermined duration and the movement of the instant film 100.

Figure 5E:
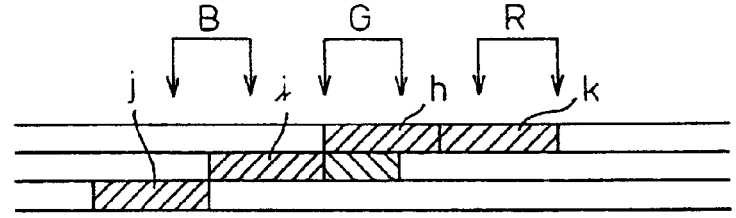
Figure 5F:
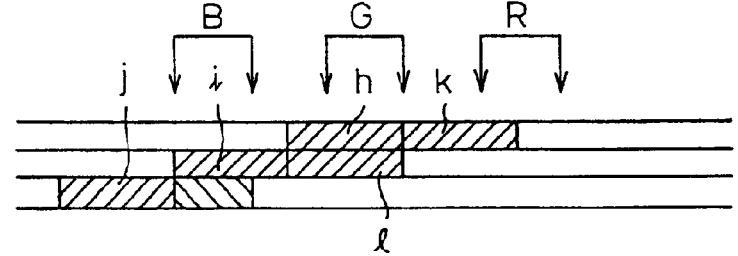

Likewise, FIG. 5E shows the state at the time when the exposure of the zone k by the light R has been completed, and FIG. 5F shows the state at the time when the exposure of the zone 1 by the light G has been completed. By repeating the same procedure, a group of images is produced on the instant film 100.

Figure 6:
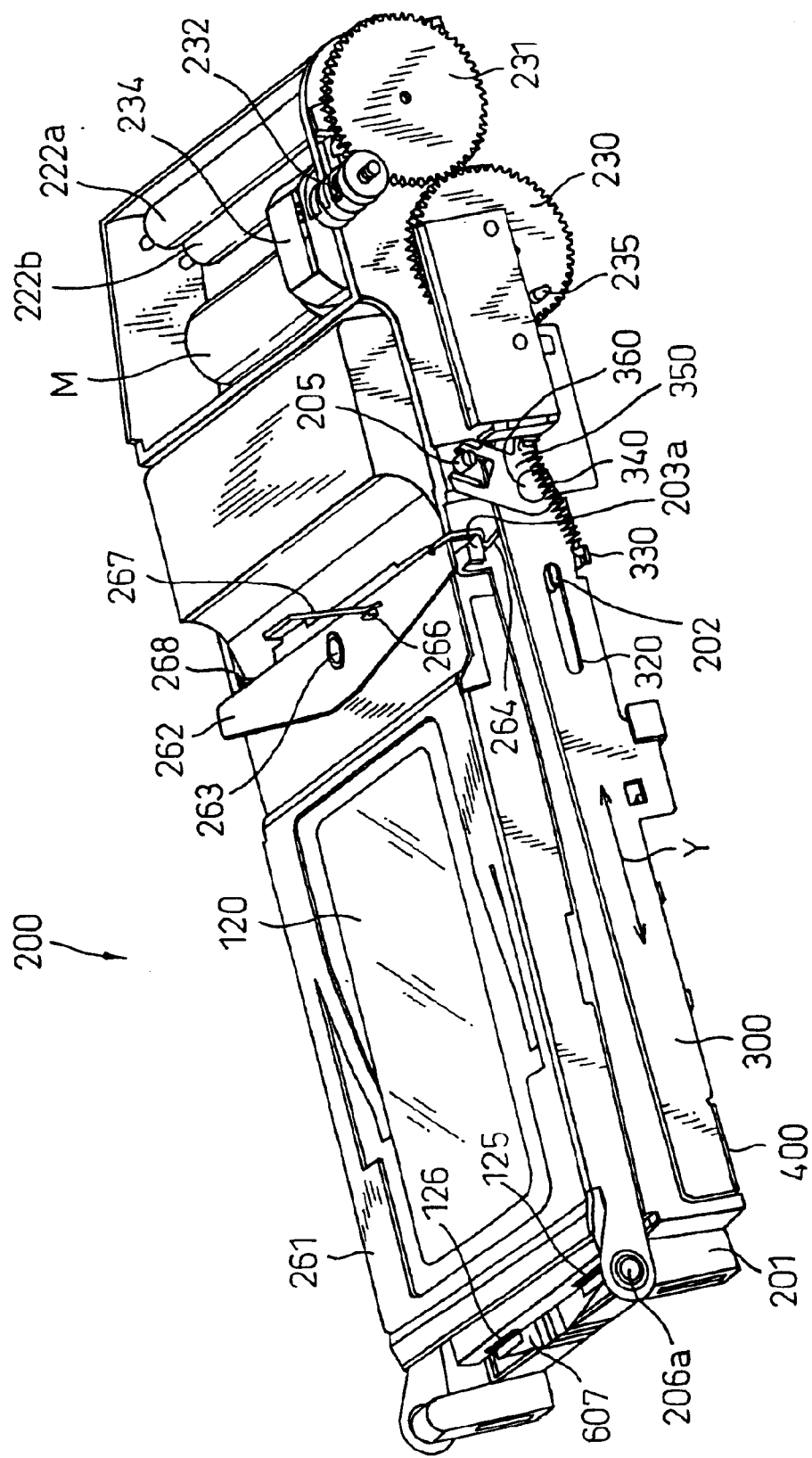
FIG. 6 is a perspective view of an optical printer according to the present invention.
Figure 7:
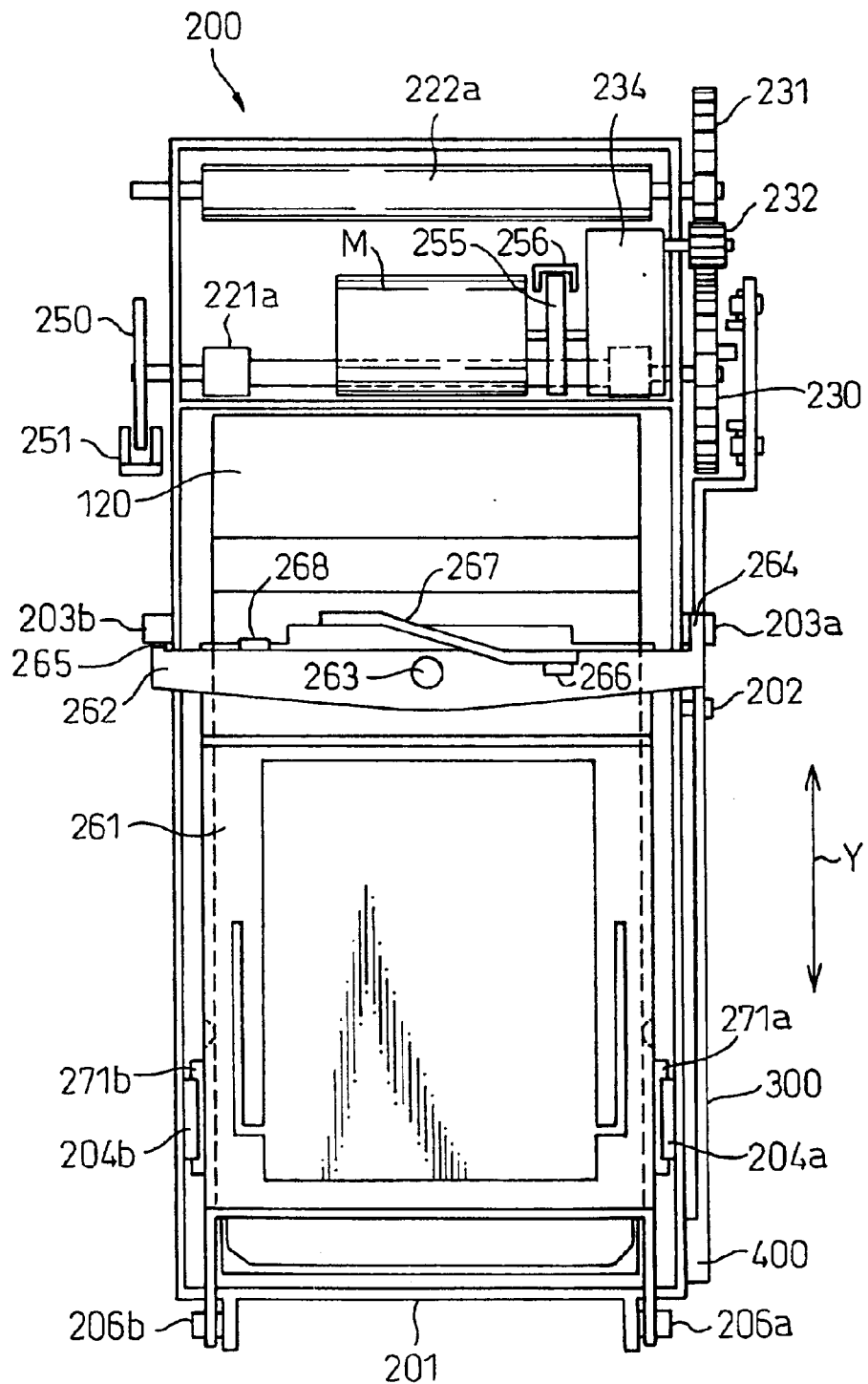
FIG. 7 is a plan view of an optical printer according to the present invention.

Next, with reference to FIG. 6 and FIG. 7, the detailed structure of the optical printer 200 according to the present invention will be described. FIG. 6 is a perspective view of the optical printer 200, and FIG. 7 is a plan view of the optical printer 200 shown in FIG. 6.

In these figures, the reference letter M denotes a motor rotated in the forward and reverse directions by the control circuit 600. The motor M rotates the gear 232 in the forward and reverse directions through the gear box 234. The reference numeral 230 denotes a gear fitted to the shaft to which the conveying roller 221b is fitted, and the reference numeral 231 denotes a gear fitted to the shaft to which the development roller 222a is fitted. As shown in the figures, the gear 232 engages with the gear 231, and the gear 231 engages with the gear 230. By the forward or reverse rotation of the motor, the development rollers 222a and 222b are driven through the gears 232 and 231, and the conveying rollers 221a and 221b are driven through the gears 232, 231 and 230.

The reference numeral 250 denotes a rotary encoder fitted to the shaft to which the conveying roller 221a is fitted, and the reference numeral 251 denotes a encoder pulse generation unit. The encoder pulse generation unit 251 generates encoder pulses (see FIG. 4(*a*)) in accordance with the rotation of the conveying encoder 250 which is in synchronization with the rotation of the conveying roller 221a. Another configuration may be applied to the encoder pulse generation unit 251 on the condition that it generates accurate pulses in synchronization with the conveying of the instant film 100.

The reference numeral 120 denotes the film cartridge aforementioned, and the reference numerals 125 and 126 denote electrodes for the battery 127 mounted on the film cartridge 120. The electrodes 125 and 126 come in contact with the contacts 607 to supply the electric power to the control circuit 600, etc.

The holder 261 holds the film cartridge 120 and is able to turn around the shafts 206a and 206b. On the upper face of the holder 261, a latch unit 262 is provided. The end portions 264 and 265 of the latch unit 262 engage with the protrusion portions 203a and 203b of the body 201 respectively to latch the holder 261 with the body 201.

The latch unit 262 is able to turn around the shaft 263 counterclockwise in FIG. 7. When the latch unit 262 turns around the shaft 263, the end portions 264, 265 and the protrusion portion 203a, 203b are disengaged each other so that the holder 261 turns around the shafts 206a and 206b. Further, the body 201 is provided with protrusion portions 204a and 204b, which engage with the engaging units 271a and 271b of the holder 261 respectively so that the holder 261 is not able to turn outside predetermined bounds. By the turning of the holder 261, the film cartridge 120 may be attached and detached easily.

The protrusion 266 is fixed to the latch unit 262, and engages with the end portion of the flat spring 267 provided on the holder 261. Thus, a force is applied to the latch unit 262 clockwise in FIG. 7 through the protrusion 266 by the flat spring 267. The latch unit 262 is not able to turn clockwise from the position in FIG. 7 due to the stopper 268 provided on the holder 261. When the latch unit 262 turns counterclockwise in FIG. 7, a force is applied to the latch unit 262 by the flat spring 267 so as to be turned clockwise. Consequently, even if the latch unit 262 is turned counterclockwise to disengage the end portions 264, 265 of the latch unit 262 and the protrusion portions 203a, 203b from each other, the latch unit 262 is automatically returned to the position in FIG. 7 by the flat spring 267.

The reference numeral 300 denotes a take-out unit for taking the instant film 100 out of the film cartridge 120 with the pick-up unit 400 provided on one end of the take-out unit 300. On the other end of the take-out unit 300, a clutch mechanism is provided. The clutch mechanism cooperates with the protrusion portion 235 provided on the surface of the gear 230 to reciprocate the take-out unit 300 in the direction of the arrow Y according to the forward and reverse rotations of the gear 230. A detailed description of the clutch mechanism is omitted.

The take-out unit 300 is provided with a opening 320 which cooperates with the protrusion portion 202 of the body 201 to restrict the reciprocation of the take-out unit 300. The take-out unit is also provided with a turning unit 350 which is able to turn freely around the shaft 360. The take-out unit 300 is also provided with a protrusion 330, and a spring 340 is provided between the protrusion 330 and the turning unit 350. The turning unit 350 is able to turn while its turning is restricted by the round protrusion portion 205 provided on the body 201.

Figure 8:
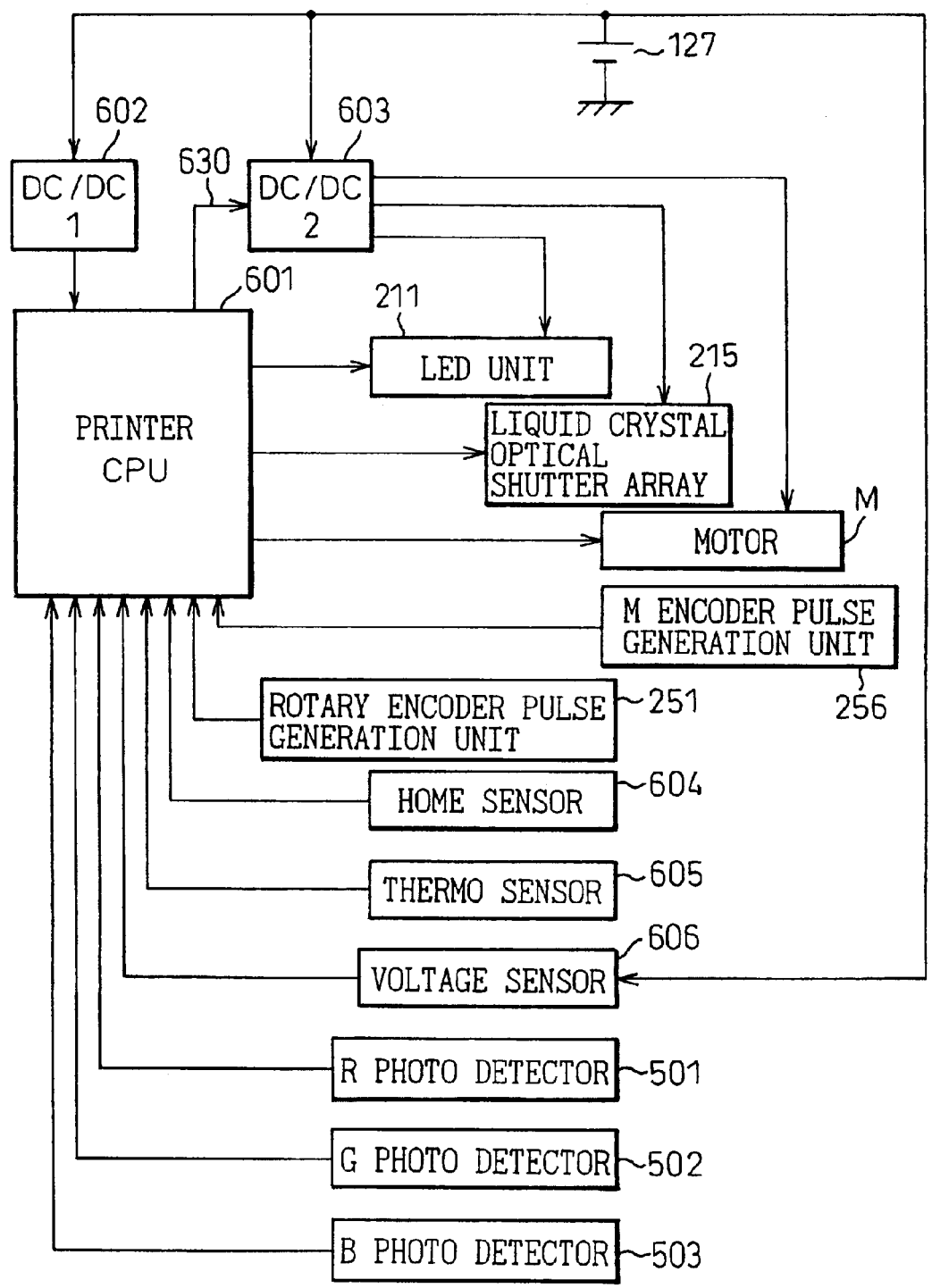
FIG. 8 is a schematic block diagram of the control circuit of an optical printer.

FIG. 8 is a schematic block diagram of the control circuit 600 of the optical printer. In FIG. 8, the reference numeral 601 denotes a printer CPU, 602 denotes a first DC/DC converter, 603 denotes a second DC/DC converter, 604 denotes a home sensor for detecting the home position of the take-out unit 300, 605 denotes a thermo sensor provided near the film cartridge 120, and 606 denotes a voltage sensor for detecting the voltage of the battery 127 of the film cartridge 120. The reference numeral 211 denotes a LED unit, 215 denotes a liquid crystal optical shutter array, 256 denotes a M encoder pulse generation unit for allowing the encoder 255 mounted on the driven shaft of the motor M to generate M encoder pulses, and 251 denotes a rotary encoder pulse generation unit for allowing the rotary encoder 251 to generate rotary encoder pulses. Furthermore, the outputs from the R photo detector 501, G photo detector 502, and B photo detector 503 of the detector 500 are also input to the printer CPU 601.

The first DC/DC converter 602 converts the voltage of the battery 127 of the film cartridge 120 to the drive voltage (3 V) for the printer CPU 601, and supplies the drive voltage to the printer CPU 601. The second DC/DC converter 603 converts the voltage of the battery 127 of the film cartridge 120 to the drive voltages for the LED unit 211, the liquid crystal optical shutter array 215, and the motor M, and supplies the drive voltages to them. The supply of the voltages from the DC/DC converter 603 to the devices concerned is controlled with the control signal 630 from the printer CPU 601.

The printer CPU 601 controls the motor M so as to turn it at a predetermined speed based on the M encoder pulses from the M encoder pulse generation unit 256. In addition, the printer CPU 601 controls the LED unit 211 and the liquid crystal optical shutter array 215 based on the encoder pulses from the rotary encoder pulse generation unit 251 (see FIG. 4).

Figure 9:
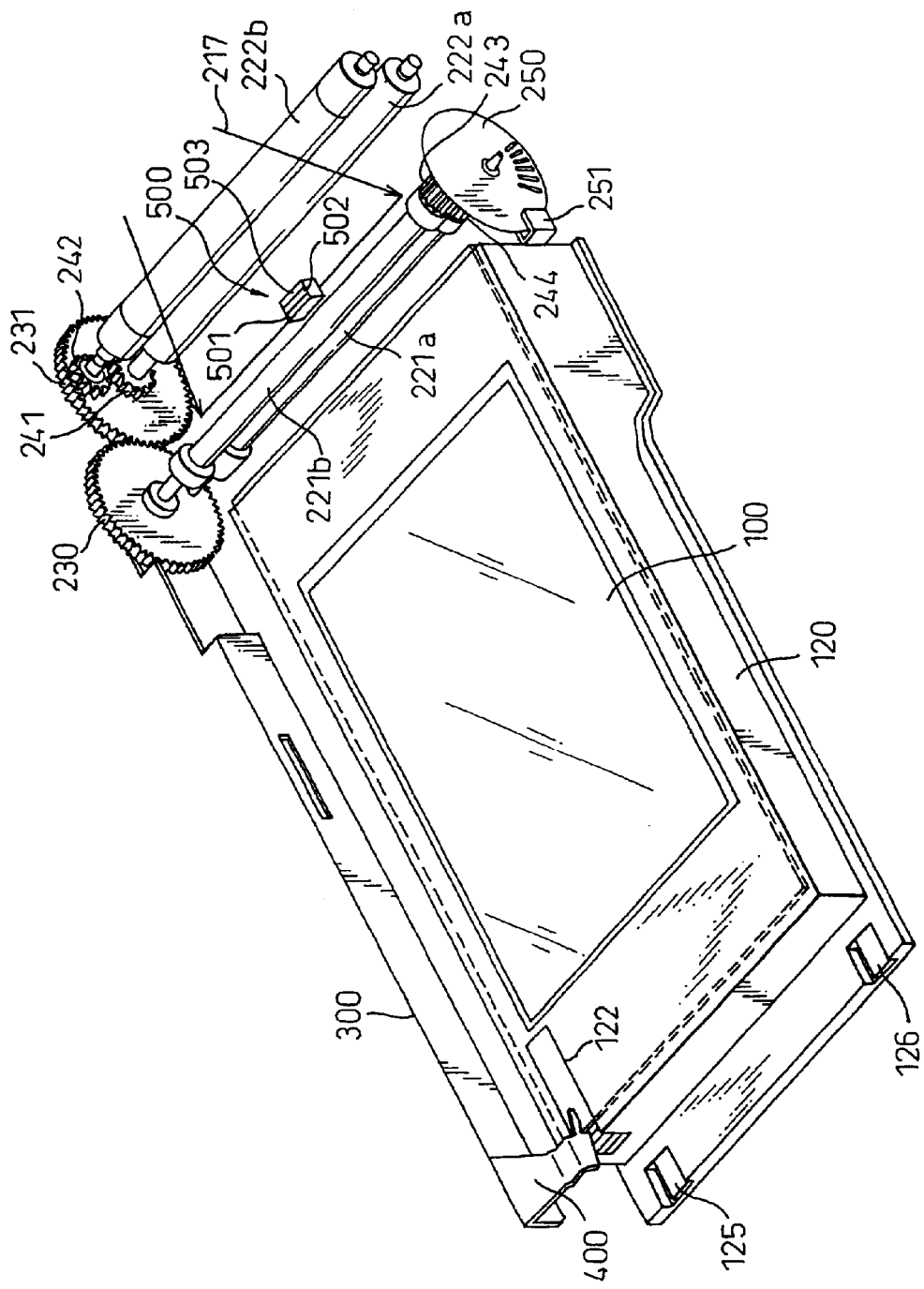
FIG. 9 depicts the relationship between an instant film and a detector.

With reference to FIG. 9 and FIG. 10, the adjustment of the amount of the exposure, the detection of the end portion of the instant film 100, etc., by the detector 500, will be described. FIG. 9 shows the state that the claw 400 of the take-out unit 300 is just in contact with the rear end of the instant film 100

During a sufficient time, before the instant film 100 reaches the position of the sensor 500, the color LEDs of the LED unit 211 have been allowed to radiate in sequence to generate a linear exposure beam 217 every R, G, and B. The exposure beams 217 of R, G, and B are received by the photo detectors 501 to 503 respectively, the output voltages corresponding to the amounts of the received lights are compared with the reference voltages, and the voltages applied to the LEDs are adjusted so that the desired amounts of light for exposure may be obtained at the exposure point P. Each of the R photo detector 501, G photo detector 502, and B photo detector 503 of the sensor 500 is disposed corresponding to the difference of the image-producing position for each color shown in FIG. 5. When the influence to the amount of the light for exposure by the difference of the image-producing position is small, the exposure beams for all colors may be received in a time-division manner by one photo detector.

After the exposure beam 217 was radiated from the LED, it passes through various kinds of optical components, in particular, the liquid crystal shutter array 215, and then is irradiated on to the instant film 100. Since the transparency of the various kinds of optical components, in particular, the liquid crystal shutter array 215, is not zero, the amount of the light of the exposure beam decreases to some extent and the manner of the decrease is not linear. For this reason, if the amount of the light radiated by the LED is adjusted by detecting the amount of the light just after the radiation from the LED, the amount of the light of the exposure beam to be irradiated on to the instant film 100 is not determined accurately. This is why the amount of the light of the exposure beam to expose the instant film 100 is adjusted for every color LED. The adjustment of the amount of the light may be carried out every instant film or every time the film cartridge is replaced. The amount of the light is corrected by the printer CPU 601 which will be described later.

As the preferred embodiment of the present invention, the optical printer in which a photo detector outputs a signal by detecting an exposure light and the amount of emission light of the light source is controlled based on the signal output from the photo detector is described above. However, the present invention is not limited to such embodiment. When the photo detector produces a signal by detecting the light which has passed through the optical shutter and exposes the photosensitive object, constitutions in which the signal is used for various adjustments such as an adjustment of transmission light of the optical shutter and so forth should be understood to be included in the scope of the present invention.

As shown in FIG. 9, a gear 241 is fitted to the shaft to which the gear 231 is fitted. The gear 241 engages with the gear 242 fitted to the shaft to which the development roller 222b is fitted. A gear 243 is fitted to the shaft to which the conveying roller 221b is fitted. The gear 243 engages with the gear 244 fitted to the shaft to which the conveying roller 221a is fitted. Thus, when the gear 231 is rotated by the motor M, the conveying roller 222b is driven through the gears 241 and 242, and the conveying roller 221a is driven through the gears 230, 243, and 244. When the motor rotates in the forward direction, the gears 232, 231, and 230 rotate, and the protrusion portion 235 provided on the gear 230 rotates. According to the rotation of the protrusion portion 235, the take-out unit 300 moves so as to push out the rear end portion of the instant film 100.

FIG. 10 shows the state that the take-out unit 300 has pushed out the instant film 100 and the front end of the instant film 100 is in the position of the sensor 500. After the amount of the light of each of the LEDs was adjusted, the exposure beam 217 of a predetermined one color (R light, in this embodiment, which is focused on the most upper reach of the direction of the conveying of the instant film) is continued to be radiated, and it is detected by the R photo detector 501 that the exposure beam 217 has been intercepted by the front end of the instant film 100. Since the developer pack 101 is provided on the front portion of the instant film 100, a photosensitive face cannot be provided on the front portion of the instant film 100. Hence, even if the exposure beam is irradiated to the front portion of the instant film 100, there is a little possibility of a large influence on the image.

As described above, when the front end of the instant film 100 has reached the position of the R photo detector and intercepts the exposure beam from the R color LED, it is detected that the front end of the instant film 100 has reached the position of the R photo detector 501. By predetermining the number of the encoder pulses to be counted, etc. before the photosensitive face 102 of the instant film 100 reaches the exposure point P after the front end of the instant film 100 has reached the position of the R photo detector 501, the exposure can be started with an accurate exposure timing.

As the preferred embodiment of the present invention, the constitution in which the photosensitive object is moved by the conveying mechanism is described above. However, a constitution in which the photosensitive object is fixed and the optical head and the photo detector are moved is also possible. Further, the light which is detected by the photo detector is required to be a light which has passed through the optical shutter but it is not required to be a light which is used to expose.

For the purpose of the above operation, the printer CPU 601 controls the LED unit 211 to allow each of the LEDs to radiate, and adjusts the voltages supplied to the LEDs, by comparing the output signals from the R photo detector 501, G photo detector 502, and B photo detector 503 with the reference values, etc., to adjust the amount of the light of the exposure beam every color, before the instant film 100 reaches the exposure point P. The printer CPU 601 controls the LED unit 211 to allow the predetermined LED (e.g., R) to radiate, and detects that the front end of the instant film 100 has reached the position of the photo detector (e.g., R photo detector) corresponding to the LED which was allowed to radiate, by detecting the output signal of the photo detector concerned, to determine the exposure timing for subsequent producing of an image. A suitable start timing of the exposure can be obtained by counting a predetermined number of encoder pulses after the front end of the instant film 100 was detected.

Next, with reference to FIG. 11A to FIG. 11E, the control of the conveying of the instant film 100 will be described. As shown in these figures, the instant film 100 is conveyed in the direction of the arrow Z by the conveying rollers 221a and 221b, and the developing rollers 222a and 222b.

FIG. 11A shows the state that the front end of the instant film 100 is intercepting the exposure beam while being conveyed by the conveying rollers 221a and 221b after the instant film 100 was pushed out of the film cartridge 120 by the take-out unit 300. As described before, as the conveying rollers 221a and 221b are so made that the diameter of the middle portion is shorter than the diameter of the both end portions, it does not happen that the self-developer is squeezed out of the developer pack 101 by the conveying rollers 221a and 221b. In this state, the counting of the number of the encoder pulses is started.

FIG. 11B shows the state where the exposure has just been started after the instant film 100 was conveyed further in the direction of the arrow Z from the position in FIG. 11A. Between the state in FIG. 11A and this state, the predetermined number of encoder pulses is counted. In the state in FIG. 11B, the front end of the instant film 100 comes into be sandwiched between the development rollers 222a and 222b, and the developer pack 101 starts to deform. Since the development rollers 222a and 222b have no difference in diameter in contrast to the conveying rollers 221a and 221b, the self-developer is squeezed out of the developer pack 101 when the instant film 100 passes through between the developing rollers 222a and 222b.

The printer CPU 601 controls the motor M to convey the instant film 100 at the first speed until the state in FIG. 11B, that is, until the instant film 100 is conveyed to the position of the development roller 222a and 222b.

FIG. 11C shows the state that part of the developer pack 101 has just passed through between the development rollers 222a and 222b after the instant film 100 has been further conveyed in the direction of the arrow Z from the position shown in FIG. 11B. In this state, the self-developer 101' has almost been squeezed out of the developer pack 101.

The printer CPU 601 controls the motor M to convey the instant film at the second speed slower than the first speed from the state in FIG. 11B to the state in FIG. 11C, that is, while the developer pack 101 passes through between the development roller 222a and 222b. This is why, if the instant film 101 is conveyed at a high speed, irregularity of the conveying, etc. may happen, because the developer pack 101 is thicker than the other portion of the instant film 101 and a large force is required to squeeze the self-developer out of the developer pack 101.

FIG. 11D shows the state that the exposure has just finished after the instant film 100 has been further conveyed in the direction of the arrow Z from the position shown in FIG. 11C. As the instant film 100 passes through between the development rollers 222a and 222b, the self-developer is distributed to the whole surface of the photosensitive material 102 while moving slowly.

The printer CPU 601 controls the motor M to convey the instant film 100 at the second speed from the state in FIG. 11C to the state in FIG. 11D, that is, until the end of the exposure. Thus, the instant film 100 is conveyed at the second speed from the start of the exposure to the end of the exposure. This is why, if the speed varies during the exposure, irregularity of the conveying happens at the position where the speed varies, and may adversely affect the image.

FIG. 11E shows the state where the instant film 100 is being output from between the development rollers 222a and 222b after the instant film 100 has been further conveyed in the direction of the arrow Z from the position shown in FIG. 11D. The developer 101' has been distributed on the whole surface of the photosensitive material 102, and the rest of the self-developer 101' is in the developer pool 104.

The printer CPU 601 controls the motor M to convey the instant film 100 at the first speed from the state in FIG. 11D to the state in FIG. 11E, that is, from the end of the exposure to the output of the instant film 100. Thus, after the end of the exposure, the instant film 100 is conveyed at the speed faster than the speed during the exposure, thereby being output earlier than the conventional optical printer.

The switching between the first speed and the second speed is done at the time when a predetermined number of the encoder pulses is counted by the printer CPU 601 after the detection signal of the photo detector was changed when the front end of the instant film 100 intercepted the exposure beam to the photo detector. Although the switching between the first speed and the second speed may be done at the time when a predetermined number of the encoder pulses is counted from the start of the rotation of the motor M, the switching is done at the proper position with low accuracy. The switching may also be done according to the output of sensors located at suitable positions to detect the instant film. However, the cost increases due to the sensors provided additionally.

In the embodiment shown in FIG. 11A to FIG. 11E, the conveying speed between the position shown in FIG. 11A and the position shown in FIG. 11B, and the conveying speed between the position shown in FIG. 11D and the position shown in FIG. 11E are set at a first speed faster than the conveying speed during the exposure, but may be set to different speeds. Further, in this embodiment, the exposure is started while the developer pack 101 is passing through between the development rollers 222a and 222b. However, in case where the exposure is started after the whole of the developer pack 101 passed through between the development rollers 222a and 222b, the conveying speed may be set to a third conveying speed slower than the first conveying speed and faster than the second conveying speed.

After the developer has been squeezed out of the developer pack 101, the surface of the instant film 100 is almost even. Even if there is a non-photosensitive portion on the rear end portion of the instant film 100 at the upper reaches of the conveying direction, the variation of the conveying speed during the conveying of such portion does not affect the image. In spite of that, in the conventional optical printer, the instant film is conveyed at the low constant speed, and thereby it takes long time until the instant film is output. On the contrary, in the optical printer according to the present invention, the time before the instant film is output may be reduced without a reduction in image quality.

In the above description, an instant film is used as a photosensitive object, but the photosensitive object is not confined to the instant film, and various kinds of photosensitive objects such as a conventional photosensitive material (negative or positive film, or negative or positive paper) may be used. In this case, it is desirable to change the exposure process according to the photosensitive object.

In the optical printer according to the present invention, the amount of the light of the light source is controlled by detecting the exposure beam which is directly irradiated to the photosensitive object, and thereby the amount of the light of the exposure beam may be controlled more accurately than in the conventional optical printer.

In addition, in the optical printer according to the present invention, since the start timing of the exposure may be decided by detecting the front end of the photosensitive object with the exposure beam, an image may be produced accurately.

In addition, in the optical printer according to the present invention, since the conveying speed of the instant film is changed according to the configuration and the exposure condition of the instant film 100, the time before the instant film 100 is output may be reduced without affecting the image.

We claim:

1. An optical printer forming images by exposing a photosensitive object, comprising:
    a light source irradiating a light;
    an optical shutter producing exposure light for exposing said photosensitive object by controlling a transmission of the light from said light source; and
    a photo detector outputting a signal by detecting the exposure light which exposes said photosensitive object,
    wherein said optical shutter and said photosensitive object relatively move so that a projection position of the exposure light onto said photosensitive object moves to produce images on said photosensitive object, and
    wherein an end of said photosensitive object is detected based on said signal from said photodetector.

2. An optical printer according to claim 1, wherein said photo detector detects the exposure light at a position lower than a position of said photosensitive object.

3. An optical printer according to claim 1, wherein the exposure of the exposure light onto said photosensitive object is carried out while said optical shutter and said photosensitive object move relatively.

4. An optical printer according to claim 1, further comprising: a light amount control mechanism for controlling the amount of emission light of said light source based on said signal from said photo detector.

5. An optical printer according to claim 4, wherein said light source radiates at least three color lights, and said photo detector detects each of said three color lights.

6. An optical printer according to claim 5, wherein said light source is of LEDs.

7. An optical printer according to claim 1, wherein a front end of said photosensitive object is detected by said photo detector, and the exposure is started based on the detected result thereof.

8. An optical printer according to claim 7, further comprising: a conveying mechanism moving said photosensitive object relatively to said optical shutter.

9. An optical printer forming images by exposing a photosensitive object, comprising:
    a light source irradiating a light:
    an optical shutter relatively moving with respect to said photosensitive object and controlling a light amount projected onto said photosensitive object from said light source; and
    a photo detector outputting a signal by detecting the light passed through said optical shutter,
    wherein the relative position between said optical shutter and said photosensitive object is detected based on said signal, and
    wherein said photo detector detects an end of said photosensitive object by detecting a change of light amount caused by the light which has passed through said optical shutter.

10. An optical printer according to claim 9, wherein said optical shutter is a liquid crystal optical shutter, and said photosensitive object is exposed when said liquid crystal optical shutter and said photosensitive object move relatively.

11. An optical printer according to claim 9, further comprising:
    a conveying mechanism moving said photosensitive object relatively to said optical shutter and said photo detector.

12. An optical printer according to claim 9, wherein said detection of said change of light amount is caused by the light which has passed through said optical shutter being intercepted by said photosensitive object.

13. An optical printer according to claim 9, wherein the exposure for the photosensitive object is started based on said signal.

14. An optical printer according to claim 9, wherein a conveying speed of said photosensitive object is changed while said photosensitive object is conveyed.

15. An optical printer according to claim 14, wherein said photosensitive object is an instant film in which self-developer is stored.

16. An optical printer forming images by exposing a photosensitive object having a photosensitive portion and a non-photosensitive portion, comprising:
    a light source irradiating a light; and
    an optical shutter moving relative to said photosensitive object and controlling a light amount projected onto said photosensitive object from said light source,
    wherein the relative speed of said photosensitive object when said photosensitive portion is exposed is slower than the relative speed of said photosensitive object when said non-photosensitive portion is exposed.

17. An optical printer according to claim 16, wherein said photosensitive object is an instant film in which self-developer is stored, and said optical printer comprises a development roller for squeezing said self-developer.

18. An optical printer according to claim 17, wherein the conveying speed of said instant film when said developer is squeezed by said development roller is slower than the conveying speed of said instant film when said developer is not squeezed.

* * * * *